Sept. 3, 1957 P. RODEN ET AL 2,804,978
FILTER AND SEPTUM
Filed June 4, 1956 2 Sheets-Sheet 1

INVENTORS
Philip Roden
BY Lawrence P. Marks
Louis O. French
Atty.

Sept. 3, 1957  P. RODEN ET AL  2,804,978
FILTER AND SEPTUM
Filed June 4, 1956  2 Sheets-Sheet 2
Fig. 5
Fig. 3
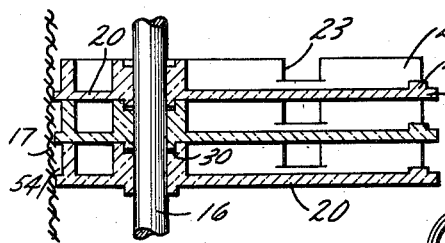
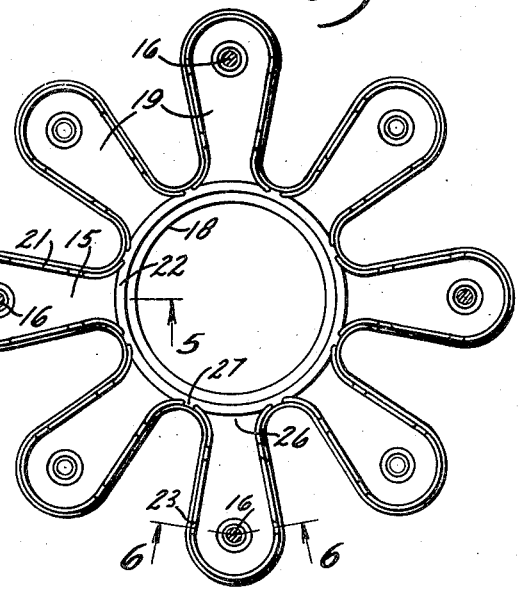
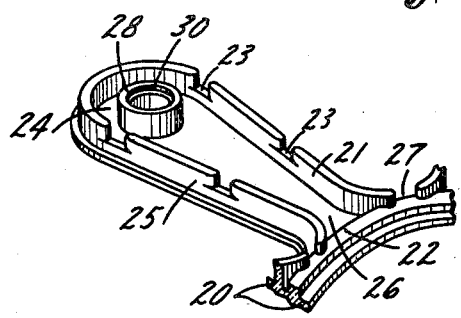
Fig. 4
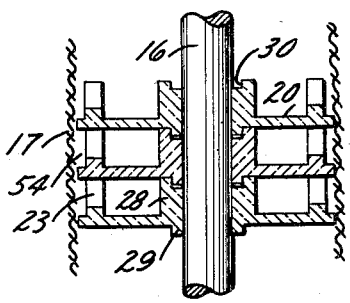
Fig. 6
INVENTORS
Philip Roden
Lawrence P. Marks
BY
Louis O. French
Atty.

United States Patent Office 2,804,978
Patented Sept. 3, 1957

2,804,978

FILTER AND SEPTUM

Philip Roden and Lawrence P. Marks, Milwaukee, Wis., assignors to Romar Filter Corporation, Milwaukee, Wis., a corporation of Wisconsin Application June 4, 1956, Serial No. 589,030

5 Claims. (Cl. 210—493)

The invention relates to an improved filtering apparatus and septum therefor employing a filter medium such as diatomaceous earth.

Septa of this type include a foraminous support for the filter media and supporting plates for this foraminous support permitting a built-up bridge of filter medium to form a filter cake while letting the influent pass through. When the cake becomes too clogged with filtered solid, the cake must be dislodged from its support, the support cleaned, and the cake replaced.

An object of this invention is to provide a septum which will provide rigid support for the filter cake, is inert to the filtrate, is easy to clean by back washing, is strong, light, and inexpensive, and may be readily disassembled if necessary. More particularly, an object of the invention is to provide a septum support for the filter carrying member comprising a series of juxtapositioned plastic disks of lobulate formation so as to provide a large filtering surface area for the over all area of the septum, these disks when clamped together permitting pressure differentials up to 100 p. s. i. to be used.

A further object of the invention is to provide an improved filtering apparatus in which the pump for circulating the fluid to be filtered is mounted directly in the top plate of the septum.

The invention further consists in the several features hereinafter described and more particularly defined by claims at the conclusion hereof.

In the drawings:

Fig. 3 is a plan view of one of the supporting disks;

Fig. 4 is an enlarged perspective view of one of the lobes of the disk;

Fig. 5 is a detailed vertical sectional view taken on the line 5—5 of Fig. 3;

Fig. 6 is a detailed vertical sectional view taken on the line 6—6 of Fig. 3.

Figure 1:
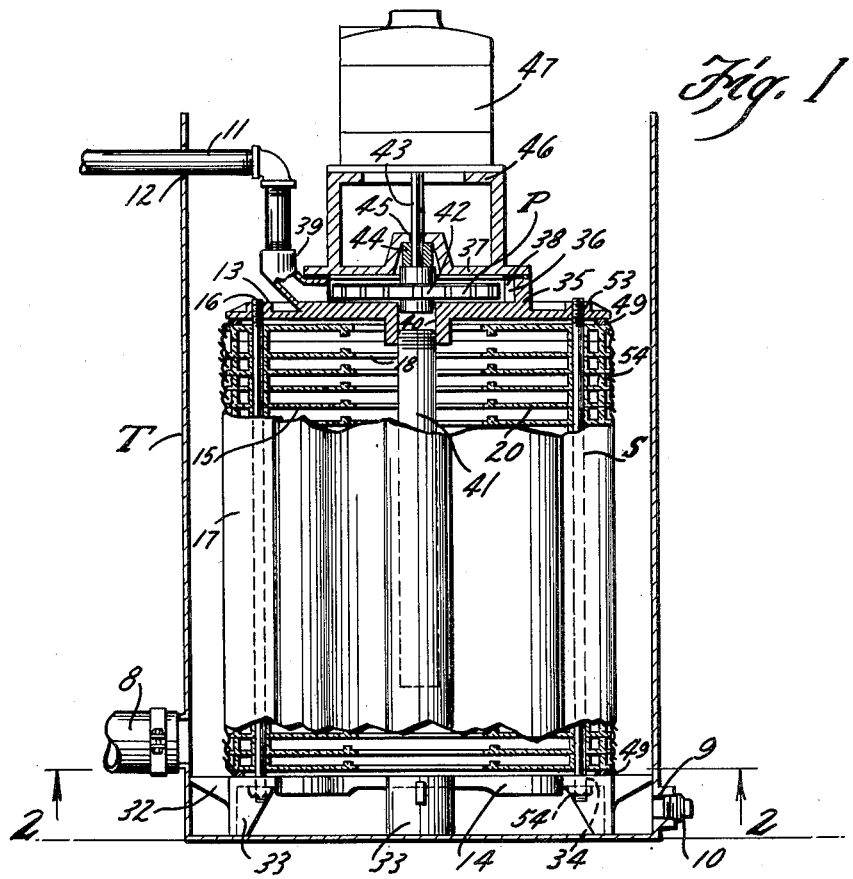
Fig. 1 is a vertical sectional view through a filtering apparatus with parts of the septum shown in side elevation.
Figure 2:
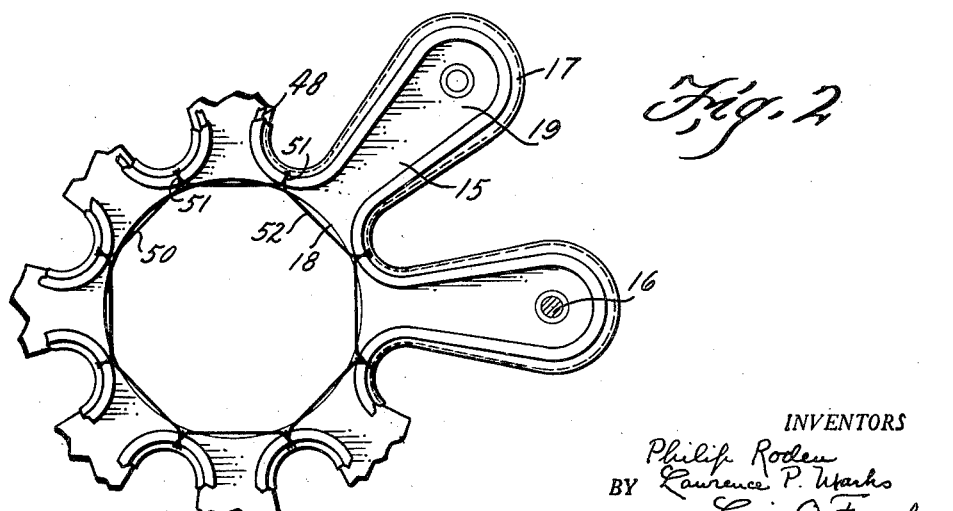
Fig. 2 is a detailed sectional view taken on the line 2—2 of Fig. 1, parts being broken away.

Referring to Fig. 1, the filtering apparatus includes a tank T, a septum S, a pump P, and connections between the apparatus and the body of liquid to be filtered.

The tank T is provided with an inlet 8 for the liquid to be filtered and a drain outlet 9 closed by a removable plug 10. The return pipe 11 for the filtered liquid extends through an opening 12 in the upper portion of the tank.

The septum S includes a head member 13, a base member 14, a series of juxtaposed supporting disks 15 clamped between the members 13 and 14 by tie rods or long bolts 16, and a filter medium carrying member 17.

Each of the disks 15 is of symmetrical lobulate formation having a central opening 18 and lobes 19, preferably eight lobes. The disk is made from a moldable inert plastic such as polystyrene.

Each disk has a thin web 20 that connects back from its outer edges with reinforcing ribs 21 for each of the lobes 19 and a reinforcing annular rib 22 that connects back from the inner edge of the opening 18, the ribs 21 being of greater height than the rib 22 and merging at their back ends into this rib as shown in Fig. 4. Each of the ribs 21 is provided with spaced series of slots 23, one set being adjacent their curved ends 24 and the other set being in their side portions 25. As the ribs of each lobe where they join the annular ribs 22 are spaced apart, an opening 26 is provided, and the ribs 22 for each lobe are spaced from each other by a slot or opening 27. The slots 23 and 27 are of less depth than the height of the ribs 22.

At the outer curved ends 24 of each lobe a circular boss 28 projects upwardly from the web 20 to a height level with the tops of the ribs 22. A smaller diameter centering boss 29 alined with the boss 28 projects downwardly from the web 20 at its opposite side. The bosses 28 are counterbored to receive the centering bosses 29 of a juxtaposed disk. As herein shown, the counterbore 30 is alined with a hole 31 that extends through the boss 29, the web 20, and the boss 29. As the bosses 28 and 29 of the disks are equidistantly radially disposed relative to the central openings 18, the disks may be readily stacked together with the bosses 29 of one disk engaging in the counterbores 30 of the adjacent disk and with the ribs 22 of one disk abutting the web 20 of an adjacent disk when said disks are clamped together in assembled relation by the tie rods 16.

The base member 14 is of metal having an imperforate bottom and of the same outline configuration as the disks but provided with tank centering projections 32 and feet 33. Four of the lobes of this member located on diagonals through the center thereof are provided with holes 34 to receive the lower ends of the rods 16.

The head member 13 is of metal having substantially the same lobed outline as the disks but provided with an enlarged cylindrical boss 35 having a circular recess 36 which cooperates with a cover member 37 to form a pump chamber 38. The chamber 38 has a conduit connection 39 connected with the return pipe 11 and connects by a centrally disposed passage 40 with a pump inlet extension 41 that projects down into the central space formed by the openings 18 in the disks as indicated in Fig. 1.

The impeller 42 of the pump is mounted at the lower end of a motor driven shaft 43 so as to work in the chamber 38, the pump here shown acting as a suction pump. The shaft 43 extends through a sealing bushing 44 and an opening 45 in the cover member 37 which has a pad portion 46 upon which the base of the electric motor 47 for driving said shaft is mounted.

The filter media carrier member 17 is of foraminous material, preferably a fabric such as nylon, that is initially formed as a tube or sleeve whose diameter is such that when it is placed over the assembled disks 15, it can be drawn in at spaced intervals to cover the lobes of said disks and their points of joinder with each other. At its ends the fabric is looped around a reinforcing cord 48 so that these ends may form sealing gaskets 49 between the top disk and head member 13 and between the lower disk and the base member 14, it being noted that all the disks 15 except the top disk have their rib portions 22 facing upwardly while the top disk has its rib portions 22 facing downwardly so that the gaskets 49 contact the web portions 22 of the upper and lower disks. These gaskets are of a thickness so that the bosses 29 do not interfere with flattening down of these gaskets to a sealed position. For holding the fabric in its drawn in position about the lobes I prefer to connect the gaskets 49 at the base portions of the lobes by a thread or cord 50 stitched at these base portions as indicated at 51 and connected at intervals by connecting portions 52, so that the gaskets are drawn over snugly against the top of the disks.

With the disks 15 assembled and the fabric secured over them as above described, the threaded tie rods or bolts 16 are run through those apertured lobes of the disks that line up with the holes 34 in the base member and corresponding alined threaded holes 53 in the lobes of the head member 13 in which one end of the bolts is anchored. Clamping pressure is then applied to the complete assembly by nuts 54 on the lower ends of said bolts engaging the lobes of the base member 14.

With the above construction, a mixture of filter aid, such as diatomaceous earth, and water is placed in the tank T whose inlet 8 may be connected to the pool or other body of liquid and the outlet connection 11 connected to lead back into the tank T. The pump is usually supplied with an air vent valve to permit ready priming, and then the motor is started so that the tank contents may be recirculated within the tank by the pump to build up a filter aid coating around the filter element. Thereafter, the air vent valve is closed and the outlet connection placed in the pool or body of liquid to be treated and the filter is now in operation.

With the filter in operation, the precoated filter element gradually picks up dirt from the water body as this water is drawn through the inlet 8 into the tank T, through the filter media into the septum by the pump P. Ultimately the filter element becomes clogged and flow ceases. This reduction or stoppage of flow indicates the filter cycle is at an end and the filter unit should be cleaned. To clean the filter, the inlet 8 is plugged off while the pump is running. When the water level in the tank T is below the pump casing, or the pump stops discharging, the motor is shut off. The drain plug 10 is then removed from the tank to drain off the remainder of the water therein. Using a suitable pressure fluid supply hose and a soft cylinder brush the filter element is washed off and this with any sediment in the bottom of the tank is run out or flushed through drain opening 9, and then the plug 10 replaced. In exceptional cases the pump and filter assembly may be lifted from the tank T for cleaning.

The multi-lobed septum, at least six and preferably eight or more for larger units, provides a much more extensive filtering area than could be obtained by a cylindrical septum of the same outer diameter. The ribs 22 are spaced back from the outer edges of the thin web 23 that are bridged by the envelope 17 so that fluid receiving spaces 54 surrounding the lobes are provided whose height is several times, five to ten times, that of the webs. The overall length of the lobes is preferably about equal to the diameter of the opening 18 in the disks so that the filter supporting surface areas of the disks is several times greater than the area of the opening 18.

The mounting of the pump on the top of the disk assembly promotes efficient circulation of the liquid being treated by the filter.

We desire it to be understood that this invention is not to be limited to any particular form or arrangement of parts except in so far as such limitations are included in the appended claims.

What we claim as our invention is:

1. A septum comprising a plurality of juxtapositioned thin plastic plates, each plate having a central aperture and a plurality of lobed portions extending from the peripheral portion of said aperture, each lobed portion having a reinforcing and spacing rib portion set back from its outer edge and extending around its outer end and along its sides and terminating at said peripheral portion and provided with flow passages, and a foraminous covering for the exposed surfaces of said plates.

2. A septum comprising a plurality of juxtapositioned thin plastic plates, each plate having a central aperture and a plurality of lobed portions extending radially from the peripheral portion of said aperture, the length of said lobed portions being about equal to the diameter of said aperture, each lobed portion having a reinforcing and spacing rib portion set back from its outer exposed edge and extending parallel thereto around its outer end and along its sides and terminating at said peripheral portion and provided with flow passages, the bases of the ribs between adjacent lobes also having a flow passage, and a foraminous covering for the exposed surfaces of said plates.

3. A septum comprising a pair of end plates, one of which has a flow passage, a plurality of juxtapositioned thin plastic plates interposed between said end plates, tie rods securing said end plates and plastic plates together, each plastic plate having a central aperture and a plurality of lobed portions extending from the peripheral portion of said aperture, each lobed portion having a reinforcing and spacing rib portion set back from its outer edge and extending around its outer end and along its sides and provided with flow passages, and a foraminous flexible covering for the exposed outer edges of said plates overlapping the outermost of said plastic plates and formed to provide a sealing gasket between said plate and the adjacent end plate.

4. A septum comprising a plurality of juxtaposed thin plastic plates, each plate having a central aperture and a plurality of lobed portions extending from the peripheral portion of said aperture, each lobed portion having a reinforcing and spacing rib portion set back from its outer edge and provided with flow passages, a fabric filter media carrier covering the exposed surfaces of the lobes of said plates, and means for drawing portions of said fabric into scalloped form about said lobed portions.

5. The septum as defined in claim 4 wherein the means for drawing the fabric into scalloped form are threads or cords secured together and connected to those portions of the fabric at the bases of the lobes.

References Cited in the file of this patent
UNITED STATES PATENTS

| | | |
|---|---|---|
| 2,448,157 | Schneider | Aug. 31, 1948 |
| 2,533,936 | Holmes et al. | Dec. 12, 1950 |